United States Patent
Lindau Nordhammer et al.

(10) Patent No.: US 8,868,031 B2
(45) Date of Patent: Oct. 21, 2014

(54) TELECOMMUNICATIONS CHARGING WITH EXTERNALLY-CONTROLLED ACCOUNT SELECTION

(75) Inventors: Peter Lindau Nordhammer, Lyckeby (SE); Andreas Abrahamsson, Karlskrona (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 155 days.

(21) Appl. No.: 13/538,340

(22) Filed: Jun. 29, 2012

(65) Prior Publication Data

US 2014/0004821 A1    Jan. 2, 2014

(51) Int. Cl.
H04M 11/00    (2006.01)

(52) U.S. Cl.
USPC ........... 455/406; 455/405; 455/407; 455/408; 455/410; 379/114.01; 379/114.03; 379/114.28; 379/127.05

(58) Field of Classification Search
USPC ................ 455/405, 406, 407, 408, 410, 411; 379/114.01, 114.03, 114.28, 127.05
See application file for complete search history.

(56) References Cited

U.S. PATENT DOCUMENTS

| | | |
|---|---|---|
| 2002/0022472 A1 | 2/2002 | Walter et al. |
| 2004/0121758 A1 | 6/2004 | Hoche et al. |
| 2006/0019360 A1 | 1/2006 | Sposato et al. |
| 2006/0019630 A1 * | 1/2006 | Sposato et al. ............... 455/406 |
| 2009/0076952 A1 * | 3/2009 | Cadenas et al. ............... 705/40 |
| 2010/0104076 A1 * | 4/2010 | Abrahamsson et al. . 379/114.01 |
| 2011/0003579 A1 * | 1/2011 | Cai et al. ..................... 455/408 |

FOREIGN PATENT DOCUMENTS

| | | |
|---|---|---|
| EP | 1 881 688 A1 | 1/2008 |
| WO | WO 01/05128 A1 | 1/2001 |
| WO | WO 2009/067101 | 5/2009 |
| WO | WO 2010/005376 | 1/2010 |

OTHER PUBLICATIONS

RFC 3588, Calhoun et al., "Diameter Base Protocol," Sep. 2003.
RFC 4006, Hakala et al., "Diameter Credit-Control Application", Aug. 2005.
U.S. Appl. No. 12/258,990 of Ambrahamsson et al., "Real-Time Flexible Account Selection for Communications," filed Oct. 27, 2008.
U.S. Appl. No. 13/464,397 of Wahlberg et al., "Product-Centric Charging System and Method," filed May 4, 2012.
U.S. Appl. No. 13/538,000 of Zackrisson, "Terminal-Initiated Override of Charging System Rules," filed Jun. 29, 2012.
Office Action issued in U.S. Appl. No. 12/258,990 dated Mar. 30, 2012.

(Continued)

*Primary Examiner* — Khalid Shaheed
(74) *Attorney, Agent, or Firm* — Baker Botts, L.L.P.

(57) ABSTRACT

A method of operating a charging system (22) for a telecommunications network comprises: (1) receiving a charging request in conjunction with a telecommunications activity involving a telecommunications terminal; (2) determining a default account to which a charge resulting from the charging request may be allocated; (3) making a request for an externally-controlled account selection of a selected account; and, (4) finally allocating the charge to the selected account. In an example embodiment and mode the method further comprises, prior to making the request for the externally-controlled account selection of the selected account, making a temporary allocation for a reservation for the telecommunications activity; and performing a default account rating for the telecommunications activity, the default account rating being performed upon assumption of use of the default account.

27 Claims, 7 Drawing Sheets

(56) References Cited

OTHER PUBLICATIONS

International Search Report and Written Opinion mailed Oct. 27, 2009 in PCT Application No. PCT/SE2009/050849.

PCT, Patent Cooperation Treaty, International Search Report and Written Opinion of the International Searching Authority for International Application No. PCT/SE2013/050640, 11 pages.

* cited by examiner

TELECOMMUNICATIONS CHARGING WITH EXTERNALLY-CONTROLLED ACCOUNT SELECTION

TECHNICAL FIELD

The technology relates to charging or financial account rendering for use of services, such as telecommunications services, for example.

BACKGROUND

For many products and/or services a customer or subscriber desires that a financial charge for the product/service be satisfied or paid from one or more of accounts, e.g., asset accounts owned by the customer or authorized for the customer's use. The debiting of the appropriate accounts, or reserving of assets in the appropriate accounts, is generally handled by a charging system.

In today's financial climate, successful companies are very cost aware. This includes employees' use of employer's telecommunication services. For example, when using mobile broadband when roaming there is a very high cost for the usage. The high cost makes it even more important to charge the cost to the correct account.

Today there are systems that allow an employer/company to set strict rules for telecommunication use, e.g., to be financially prudent, the company can carry only the cost for calls inside a virtual private network, for example. However, the strict rule does not suit all companies/employers due to the nature of business.

Therefore, some companies employ a technique known as prefix dialing in order to allocate financial responsibility to calls. That is, some contemporary charging systems support shared accounts, e.g., the ability of a same subscriber or customer to use both a personal account and a company account by permitting the subscriber to begin a call with a certain prefix number or the like which serves to select which of plural possible accounts is to be used. However, such an up-front technique such as prefix dialing has considerable impact on the network and there are no standardized solutions to accommodate the technique. Moreover, it is not very user-friendly way of communicating with a subscriber. In general, current methods used to allocate charges before session setup are generally not sufficient and do not work for all services.

In some situations the account selection (e.g., between a personal account and a company account) is statically configured. In other situations a network attempts to deduce the nature of the telecommunications use and thus select an appropriate account based on information provided to or detected by the network. But neither such static personalized configurations or network-deduced account selection is desirable since often only the subscriber/user best knows the reason for the usage, and therefore how best to allocate the cost for the service at a specific point in time.

Paying for content using a mobile phone is an example of a situation in which user account selection is needed. A pre-configured account selection or network account selection routine is not optimum for determining whether such use is appropriate to charge to an employer or the employee. For example, if a person downloads mobile content while traveling on a subway, it may be difficult for anyone other than the person who downloads to know whether the travel is for business or private purposes, and hence whether the download is personal or for business. Even for applications such as mobile phone applications purchased from an application store or the like, it may be difficult to ascertain whether the application has private or professional usages.

SUMMARY

In one of its aspects the technology disclosed herein concerns a method of operating a charging system for a telecommunications network. In a basic embodiment and mode the method comprises: (1) receiving a charging request in conjunction with a telecommunications activity involving a telecommunications terminal; (2) determining a default account to which a charge resulting from the charging request may be allocated; (3) making a request for an externally-controlled account selection of a selected account; and (4) finally allocating the charge to the selected account.

In an example embodiment and mode the method further comprises, prior to making the request for the externally-controlled account selection of the selected account, making a temporary allocation for a reservation for the telecommunications activity; and performing a default account rating for the telecommunications activity, the default account rating being performed upon assumption of use of the default account.

In an example embodiment and mode the externally-controlled account selection may be an identification of an alternate account other than the default account. In another example embodiment and mode the externally-controlled account selection comprises parameters which are externally-input and from which the charging system determines the selected account.

In an example embodiment and mode the method further comprises receiving the externally-controlled account selection (when the externally-controlled account selection indicates that the selected account is different than the default account); then performing a selected account rating of the telecommunications activity; and allocating the charge to the selected account in accordance with the selected account rating.

In an example embodiment and mode the method further comprises allocating the charge to the default account as the selected account in absence of any response to the request.

In an example embodiment and mode the method further comprises receiving the selection, wherein the selected account is the default account; and then finally allocating the charge to the default account in accordance with the default account rating.

In an example embodiment and mode the method further comprises, making a determination whether to make the request for the externally-controlled account selection.

In an example embodiment and mode the method further comprises using at least one of the following factors for making the determination whether to make the request for the externally-controlled account selection: (a) a subscriber account parameter; (b) a shared account parameter; and, (c) an input parameter from an external source.

In an example embodiment and mode the method further comprises requesting a human to make the externally-controlled account selection of a selected account In an example embodiment and mode the method further comprises requesting a user of the telecommunications terminal to make the externally-controlled account selection of a selected account.

In an example embodiment and mode the method further comprises using at least one of the following factors for determining the default account: (a) a subscriber account parameter; (b) a shared account parameter; and (c) an input parameter from an external source.

In an example embodiment and mode the method further comprises providing a time window for receiving an indication of the selected account; and, during the time window, permitting performance of the telecommunications activity;

In an example embodiment and mode the method further comprises making the request using at least one of (1) a voice call to an interactive voice response system; (2) a Short Message Service (SMS) message; (3) an Unstructured Supplementary Services Data (USSD) message; or (4) an Internet message.

In another of its aspects the technology disclosed herein concerns a charging system. The charging system is configured to make an initial determination of a default account to which to allocate a charge resulting from a charging request received in conjunction with a telecommunications activity and thereafter to finally allocate the charge to a selected account in accordance with an externally-controlled account selection.

In an example embodiment the charging system is further configured to make a request for the externally-controlled account selection of the selected account.

In an example embodiment the charging system is further configured to make the request using at least one of (1) a voice call to an interactive voice response system; (2) a Short Message Service (SMS) message; (3) an Unstructured Supplementary Services Data (USSD) message; or (4) an Internet message.

In an example embodiment charging system is further configured to make the request for the externally-controlled account selection of the selected account after performing a default account rating for the telecommunications activity, the default account rating being performed upon assumption of use of the default account.

In an example embodiment the charging system is configured, after receiving an indication that the selected account is different than the default account, to perform a selected account rating of the telecommunications activity upon assumption of use of the selected account before finally allocating the charge to the selected account in accordance with the selected account rating.

In an example embodiment the charging system is configured to allocate the charge to the default account as the selected account in absence of any response to the request.

In an example embodiment the charging system is configured, upon receiving an indication that the selected account is the default account, to allocate the charge to the default account in accordance with the default account rating.

In an example embodiment the charging system is configured to make a determination whether to make the request for the externally-controlled account selection.

In an example embodiment the charging system is configured to use at least one of the following factors to make the determination whether to make the request for the externally-controlled account selection: (a) a subscriber account parameter; (b) a shared account parameter; and, (c) an input parameter from an external source.

In an example embodiment the charging system is configured to make the initial determination of the default account using at least one of the following factors: (a) a subscriber account parameter; (b) a shared account parameter; and, (c) an input parameter from a external source.

In an example embodiment the charging system is configured to provide a time window for receiving an indication of the selected account and to permit performance of the telecommunications activity during the time window.

In an example embodiment the charging system comprises electronic circuitry.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
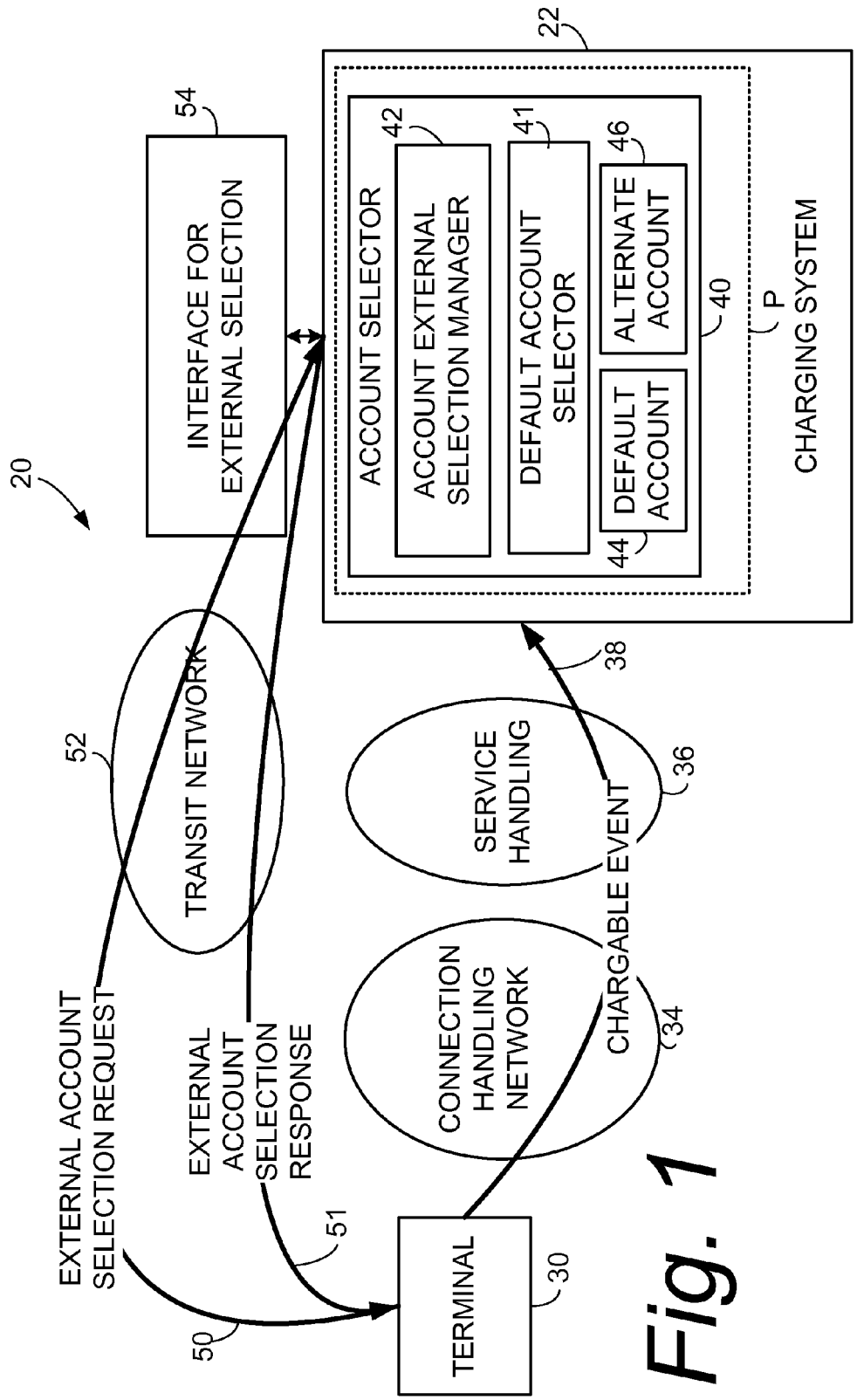
FIG. 1 is a diagrammatic view of a communication system comprising a charging system according to an example embodiment.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

As alluded to above, a terminal may be used for different types of telecommunication activity, e.g., for both company activity (e.g., company calls or company-related browsing) and personal activity (e.g., personal calls or personal browsing). As used herein, telecommunication activity(ies) encompass(es) both telephone call services and use of data services, all such telecommunications activity herein being also referred to as a "service". In some cases the company allows that personal telecommunication activities are also paid by the company, but in some cases the company only wants to pay for telecommunication activities which are related to work. For the latter case either some basic rules can be created or the employee may require one personal mobile and one company mobile.

FIG. 1 shows a communication system 20 wherein charging system 22 is employed to obtain revenue for use of telecommunications services by equipment such as terminal 30. The terminal 30 may be any type of telecommunications equipment, e.g., wireless or wired. The charging system 22 serves, e.g., to associate use of a service by the terminal 30 with an appropriate one of possible plural available accounts to be charged for use of the service. Use of the service occurs as the terminal 30 participates in (e.g., initiates, terminates, or otherwise engages in) telecommunications activities using the service. The service may use a circuit switched connection or a packet switched connection, and may be a call or a session (such as an Internet session, for example). The service typically involves use of a connection handling network 34 (e.g., a radio access network and/or a core network in the case of a wireless terminal, for example) and/or service handling functionality 36 of the communication system 20. Use by the terminal 30 of one or more connection handling networks 34 and/or service handling functionality 36 involve telecommunication activities which in turn result in notifications of chargeable events (depicted by arrow 38) to charging system 22.

The charging system 22 comprises account selector 40, which in turn comprises default account selector 41 and account external selection manager 42. The account selector 40 associates each of the telecommunications activities or transactions for which the charging system 22 has financial responsibility with at least one account. The association to the accounts may occur upon receipt of a charging request. As understood by those skilled in the art, the account selector 40 has access to a data base of accounts, one or more of which may be eligible for charging for use of terminal 30 of any particular service or product. For sake of simplicity FIG. 1 shows account selector 40 as having access to two accounts, e.g., a default account 44 and an alternate account 46. In accordance with the technology disclosed herein, the account selector 40, and particularly its account external selection manager 42, implements externally-controlled account selection in order to enable a person external to charging system 22, e.g., an operator or user of a terminal, to make a selection regarding the proper account to charge for a particular telecommunications charging event.

Figure 3A:
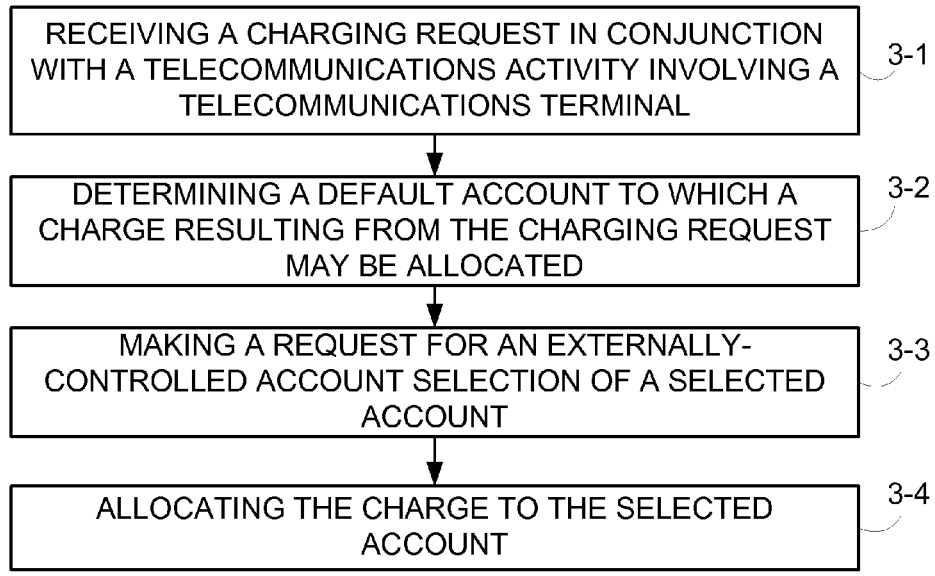
FIG. 3A is a flowchart showing example acts or steps which comprise an example embodiment of operating a charging system wherein externally-controlled account selection is implemented.

FIG. 3A shows example acts or steps which comprise an example embodiment of operating a charging system wherein externally-controlled account selection is implemented. Act 3-1 comprises receiving a charging request in conjunction with a telecommunications activity (e.g., charging event) involving a telecommunications terminal 30. FIG. 1 represents such a charging event by arrow 38. Act 3-2 comprises the charging system 22 determining a default account to which a charge resulting from the charging request may be allocated. As used herein, "may be allocated" signifies that the default account is a candidate account to which the charging request may eventually or ultimately be allocated, or to which the charging request is at least temporarily associated in anticipation of possible subsequent definitive allocation. As explained below, the charging request is not actually allocated, e.g., the charging requesting is not finally committed to an account (either the default account or an alternate account), until act 3-5. Thus, act 3-2 essentially involves determination of the default account, not a charging to the default account. In FIG. 1 such default account is depicted as default account 44.

Act 3-3 comprises the charging system 22 making a request for an externally-controlled account selection of a selected account. In an example mode and embodiment, such request is made using an external account selection request message or signal 50. The external account selection request message 50 is sent through an interface 54 for external selection; through transit network 52; and to the recipient terminal. The transit network 52 may include some or all of connection handling network 34, or other networks, nodes, and servers (examples of which are provided herein).

As a result of transmission of external account selection request message 50, an account is selected (either actively or passively) to be the selected account and such selection may be transmitted through a message or signal such as that illustrated in FIG. 1 as external account selection response message 51. The "selection" of the selected account may comprise input which specifically identifies the selected account. Alternatively the "selection" of the selected account may comprise input in the form of one or more parameters that enables the charging system 22 to determine the selected account that best matches or befits the input parameters, e.g., the input parameters that influence or govern, and thus at least partially control selection of the selected account. In either case, the input may be provided through the external account selection response message 51. Moreover, in either case the external input or response actually influences and thus essentially governs or controls the selection of the selected account. In the former case the charging system 22 is actually provided with an identification of the selected account, in the latter case the charging system 22 is provided with input parameters sufficient for the charging system 22 to deduce which account is to be the selected account. In other words, in the latter case the externally-controlled account selection comprises parameters which are externally-input and from which the charging system determines the selected account.

As an example, the external account selection request message 50 as sent to its recipient may include a textual prompt or user interaction information such as the following: "Terminal X is now using a WIFI service that is outside of company Y. Press '1' to charge a private account; press '2' to continue to charge company Y's account". The external account selection response message 51 carries the responsive information entered in response to the external account selection request message 50 back to charging system. In the example just described, the responsive information may be a DTMF coded '1' or '2' value.

Act 3-4 comprises the charging system 22 finally allocating the charge to the selected account. That is, the charging system 22 finally and definitively attributes the charge to the selected account so that the owner of the selected account becomes liable for the charge. For example, the selected account may be an account instead of the default account, e.g., another account represented by alternate account 46 in FIG. 1. Moreover, as used herein the "selected account" may comprise plural accounts that are related or otherwise connected for potential charging purposes. For example, the selected account may be a set of accounts that are utilized in any particular sequence or hierarchy. Such sequence or hierarchy may be invoked, for example, when a first account of a set does not have a sufficient balance to fund the charging request, and a second account of the set may consequentially qualified or eligible to next be debited or charged to fund the charging request, and so on with other accounts of the set. It should also be kept in mind that in situations in which the default account is the selected account, the default account may also belong to a set of accounts that may be utilized in a sequence or hierarchy and thus the default account also may represent plural accounts.

Figure 2:
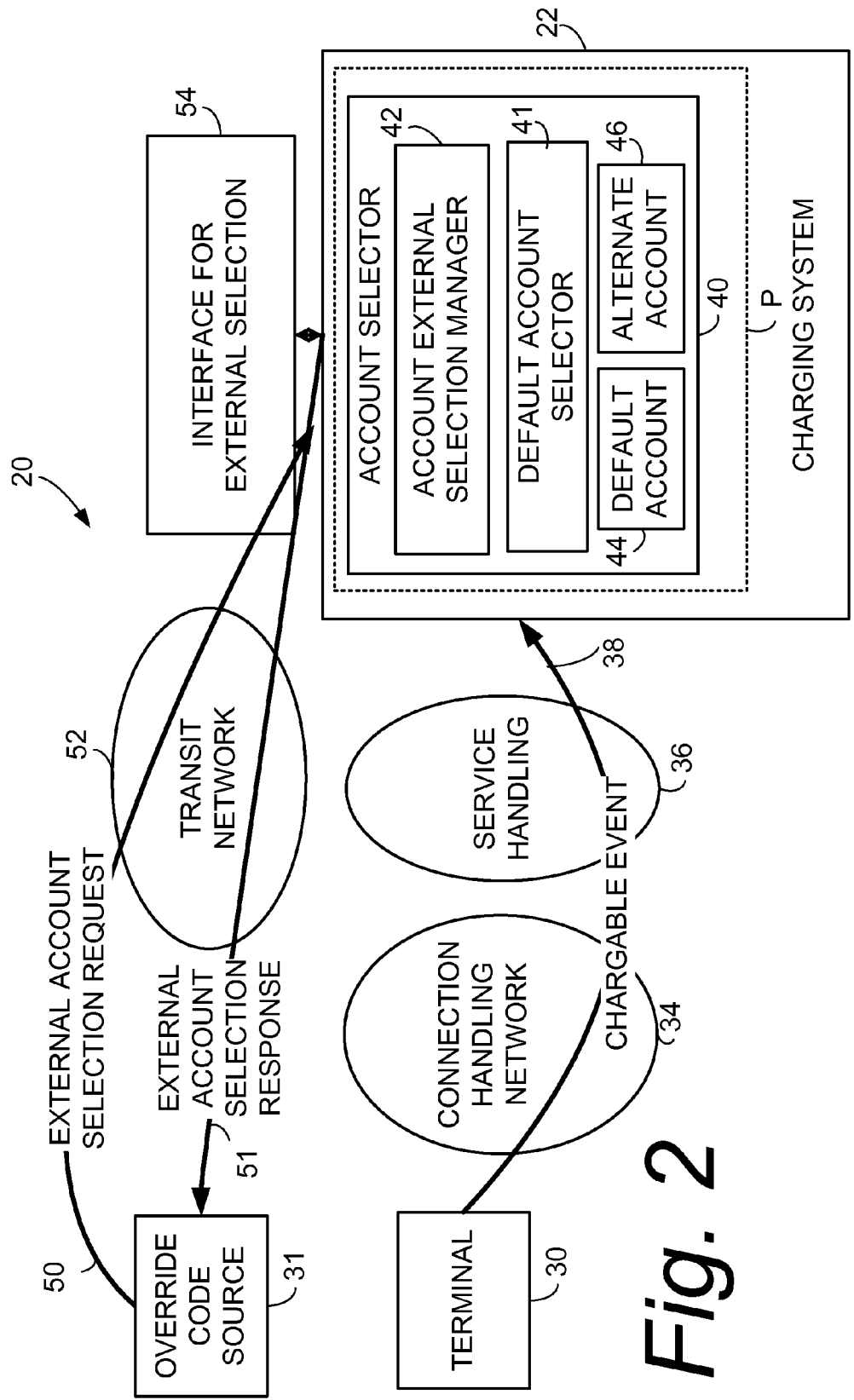
FIG. 2 is a diagrammatic view of a communication system comprising a charging system according to another example embodiment.

In the particular example embodiment shown in FIG. 1 the account selection request message is sent to the terminal 30 which is affected by or involved in the service. The account selection request message is generated by the charging system 22; travels through transit network 52; and, in an example embodiment, terminates at terminal 30. However, it should be appreciated that in other embodiments, such as those generically depicted by FIG. 2, the account selection request message may be sent instead to another external decision maker, such as a decision maker at another device or terminal 31. For example, the account selection request message may be sent to another terminal, either wireless or wired, such as a mobile station or a web portal. In other words, the account selection request message may be sent to a person other than a user of affected terminal 30, e.g., by an administrator or receptionist of a company, for example. Unless otherwise noted, the ensuing description applies to either mode of interaction: either sending the account selection request message to terminal 30 or to terminal 31.

Figure 4:
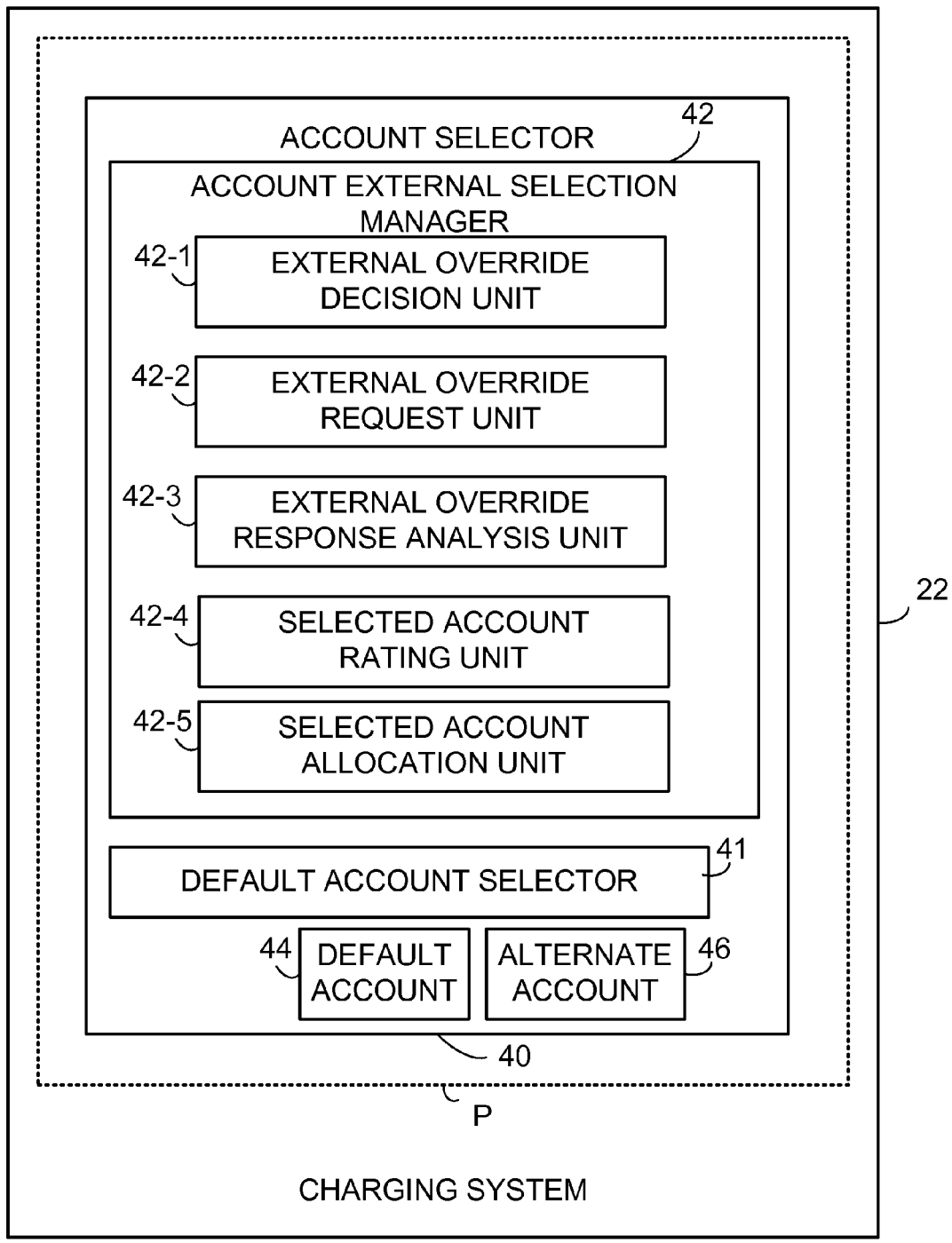
FIG. 4 is a schematic view of portions of a charging system according to an example embodiment.

FIG. 4 shows example functionalities or units of an example account external selection manager 42 according to an example implementation. In the exemplary illustrated embodiment, account external selection manager 42 of FIG. 4 comprises external override decision unit 42-1; external override request unit 42-2; external override response analysis unit 42-3; selected account rating unit 42-4; and selected account allocation unit 42-5.

Figure 3B:
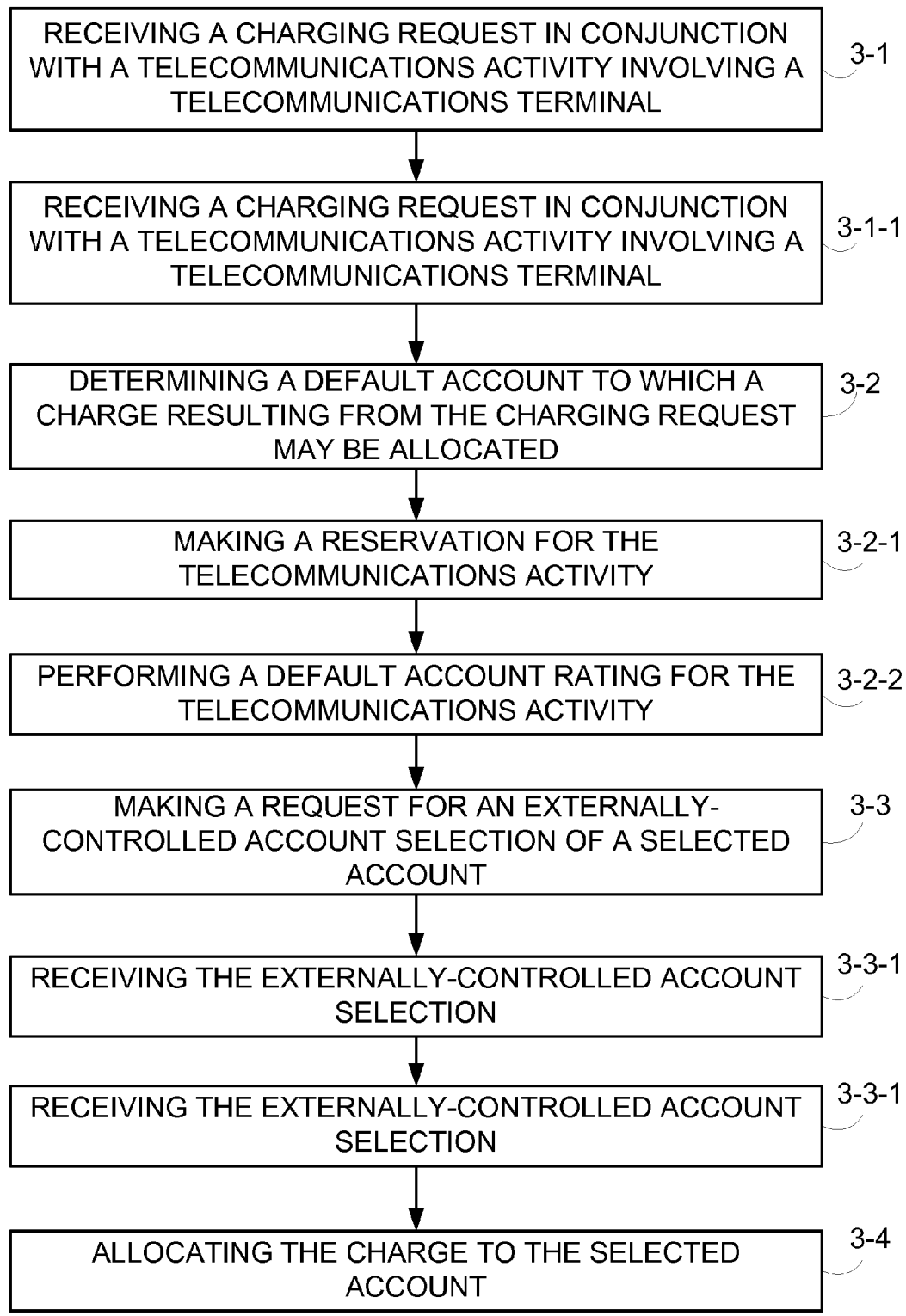
FIG. 3B is a flowchart showing further example acts or steps which may comprise an example embodiment of operating a charging system wherein externally-controlled account selection is implemented.

FIG. 3B shows further example acts of steps which, in an example embodiment and mode, may accompany or augment the acts of FIG. 3A. Some of these acts may be performed by units or functionalities shown in FIG. 4.

For example, act 3-1-1 comprises the charging system 22 (and in particular external override decision unit 42-1) making a determination whether to make the request for the externally-controlled account selection. Since the request may not need to be made for each charging event, the charging system 22 may evaluate the opportunities to make the external request and choose those which match or satisfy certain criteria. Indeed, the determination may be based on several factors. The request for externally-controlled account selection, taking very possible forms of prompting or interaction, may in some embodiments be triggered by such factors as a nature of the service scenario; a cost limit of an event or session or total spending during a particular time. In some embodiments, issuance of such request for externally-controlled account selection may be filtered so that the request for externally-controlled account selection is issued only with respect to certain persons, such as high spenders or persons using certain types of services such as content services. In an example embodiment and mode the method further comprises using at least one of the following factors for making the determination whether to make the request for the externally-controlled account selection: (a) a subscriber account parameter (b) a shared account parameter; and, (c) an input parameter from a external source Examples of subscriber account parameters include subscribed products, account balances, discount plan(s), and language. Examples of shared account parameters include shared subscriber products, shared account balances, and connected discount plan(s). Examples of input parameters from a external source include location, time, roaming status, service identifier, dialed number, etc. As used herein, a "external source" may include the charging client, a Gateway GPRS Support Node (GGSN) or an external system, such as a Home Location Register (HLR) or a Flexible Number Registry (FNR), for example.

Further, the external override decision unit 42-1 may also make a decision as to whom to send the external account selection request message 50, e.g., to and address or identifier that may correspond to a human or to a machine such as a computer. For example, the external override decision unit 42-1 may make a decision to send the external account selection request message 50 either to terminal 30 which is actually participating in the service for which the charging event occurs, or to another terminal 31 as above described with reference to FIG. 2.

FIG. 3B also shows that the method may further comprise additional acts 3-2-1 and 3-2-2 which may be performed prior to act 3-3. Act 3-3 is the act of making the request for the externally-controlled account selection of the selected account, e.g., sending the external account selection request message 50. The external account selection request message 50 may be generated by external override request unit 42-2. As discussed further herein, e.g., with reference to FIG. 7, the type of message employed for making the request may be at least one of (1) a voice call to an interactive voice response system; (2) a Short Message Service (SMS) message; (3) an Unstructured Supplementary Services Data (USSD) message; or (4) an Internet message. As described above, the external account selection request message 50 may be formatted to include a choice of accounts, e.g., a default account or an alternative account. The charging system 22 may determine what accounts to use as the default account based on various factors, such as a subscriber account parameter, a shared account parameter; and/or an input parameter from an external source, as discussed herein.

Act 3-2-1 comprises making a temporary allocation for a reservation for the telecommunications activity. The act of "making a temporary allocation for a reservation for the telecommunications activity" may include, by way of non-limiting example, reserving funds (e.g., money or resource units, for example) for a limited time period to grant the delivery of service, either partially or fully.

Act 3-2-2 comprises performing a default account rating for the telecommunications activity. The default account rating is upon assumption of use of the default account. The default rating is performed and may be used if the default account becomes the selected account, which could occur either by a timer expiring with no active response to the external account selection request message 50 or by the input in the external account selection response message 51 actively indicating that the default account is the selected account. Moreover, the service continues while waiting for either receipt of the message 51 or the time expiration Further example acts of the embodiment and mode of FIG. 3B comprise act 3-3-1 and 3-3-2. Act 3-3-1 comprises the charging system 22 receiving the externally-controlled account selection. The externally-controlled account selection may, in a response active case, be received through the external account selection response message 51 (see FIG. 1). Like external account selection request message 50, the external account selection response message 51 may take the form of (1) a voice call to an interactive voice response system; (2) a Short Message Service (SMS) message; (3) an Unstructured Supplementary Services Data (USSD) message; or (4) an Internet message, and typically is the same form as the external account selection request message 50. In a passive case, the externally-controlled account selection may be a non-response which, after expiration of the timer, informs the charging system 22 that the default account is the selected account.

In the above regard, a time window may be allowed for receiving an indication of the selected account and during the time window performance of the telecommunications activity is permitted. Once received, the external account selection response message 51 may be processed by external override response analysis unit 42-3.

As explained above, in an active mode in which the external account selection response message 51 is received, the external account selection response message 51 may explicitly identify the selected account or may include a parameter or value representative or indicative of the selected account. The charging system 22 may comprising a mapping of such parameters or values or a rule engine whereby the charging system 22 may deduce from the content of the external account selection response message 51 what account is intended by the responder to be the selected account.

Act 3-3-2 is performed when the externally-controlled account selection indicates that the selected account is different than the default account. Act 3-3-2 comprises the charging system 22 performing a selected account rating of the telecommunications activity. The rating of the selected account may be performed by selected account rating unit 42-4. Then, as act 3-4, the charge is allocated to the selected account in accordance with the selected account rating. The actual charge allocation may be accomplished by selected account allocation unit 42-5.

Figure 5:
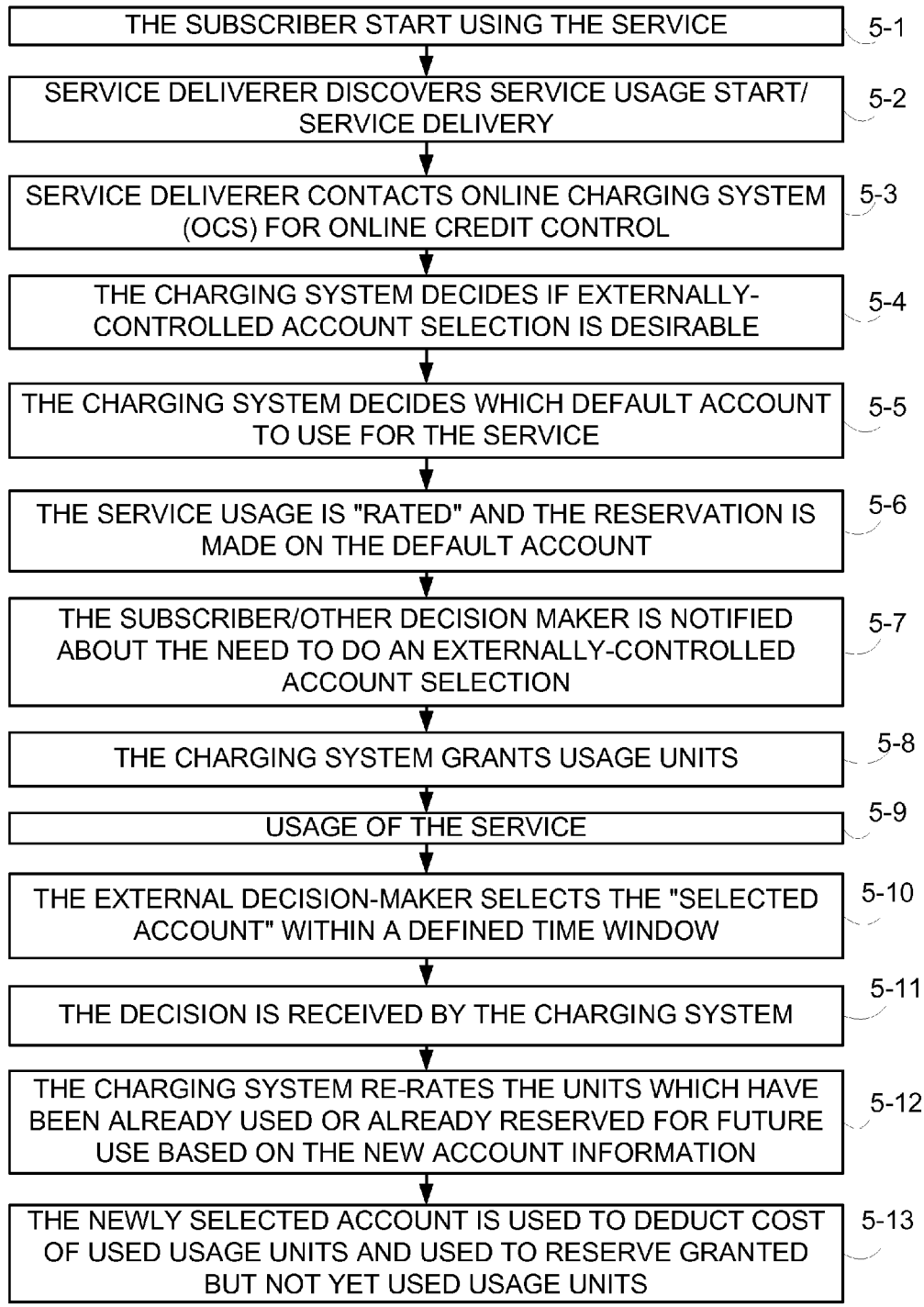
FIG. 5 is a flowchart showing example acts or steps which comprise an example implementation of a charging system wherein externally-controlled account selection is implemented.

FIG. 5 illustrates a sequence of acts or events which may occur in an example embodiment and mode in a broad context of the technology disclosed herein. Act 5-1 comprises the subscriber start using the service. Act 5-2 comprises the external source discovering service usage start/service delivery. Act 5-3 comprises the external source contacting the Online Charging System (OCS), e.g., charging system 22, for online credit control.

Act 5-4 comprises the charging system 22 deciding if externally-controlled account selection is desirable for this particular subscriber and this particular service scenario. Such decision may be based on such factors as subscriber account parameters, shared account parameters from a provider account, information from external systems, and/or input parameters received from the external source. Act 5-5 comprises the charging system 22 deciding which default account to use for the service. In an example embodiment and mode the default account decision may be based on such factors as subscriber account parameters, shared account parameters from a provider account, information from external systems, and/or input parameters received from the external source, as described in U.S. patent application Ser. No. 12/258,990 of ABRAHAMSSON et al, entitled REAL-TIME FLEXIBLE ACCOUNT SELECTION FOR COMMUNICATIONS, which is incorporated herein by reference in its entirety. Act 5-6 comprises a "rating" of the service usage and making at least temporary allocation for a reservation on the default account.

As act 5-7 the subscriber or other decision maker is notified about the need to do an externally-controlled account selection for the cost of the service usage. The notification may be the external account selection request message 50, and may take different forms as discussed herein and illustrated by FIG. 7. All different decision parameters can be included in the notification, including, for example: a subscriber account parameter; a shared account parameter; and, an input parameter from an external source, all as discussed herein. As act 5-8 the charging system 22 grants units of the service in an answer to the external source. Act 5-9 represents usage of the service. The charging system may be asked several times for new requested usage units and used usage units may be reported.

Act 5-10 depicts the external decision-maker selecting the account to use (the "selected account") for the usage within a defined time window. As mentioned above, the "selection" may take the form of input that is an identification of the selected account, or the form of input parameters from which the charging system 22 may determine the selected account. As act 5-11, the decision, e.g., the externally-controlled account selection decision (e.g., the external account selection response message 51), is received by the charging system. Act 5-12 comprises the charging system re-rating the units which have already been used or already reserved for future use based on the new account information, e.g., information regarding the newly selected account. Then, as act 5-13, the newly selected account is used to deduct cost of used usage units and used to reserve granted but not yet used usage units.

The charging system 22 may perform differing response scenarios depending on the nature and content of the response to the external account selection request message 50. As indicated above, the response to the external account selection request message 50 may be active (in which case the external account selection response message 51 is generated by terminal 30 or terminal 31), or passive (no response to the external account selection request message 50). In the passive case in which there is no response to external account selection request message 50, the charging system 22 presumes that the default account is to be the selected account.

Figure 6:
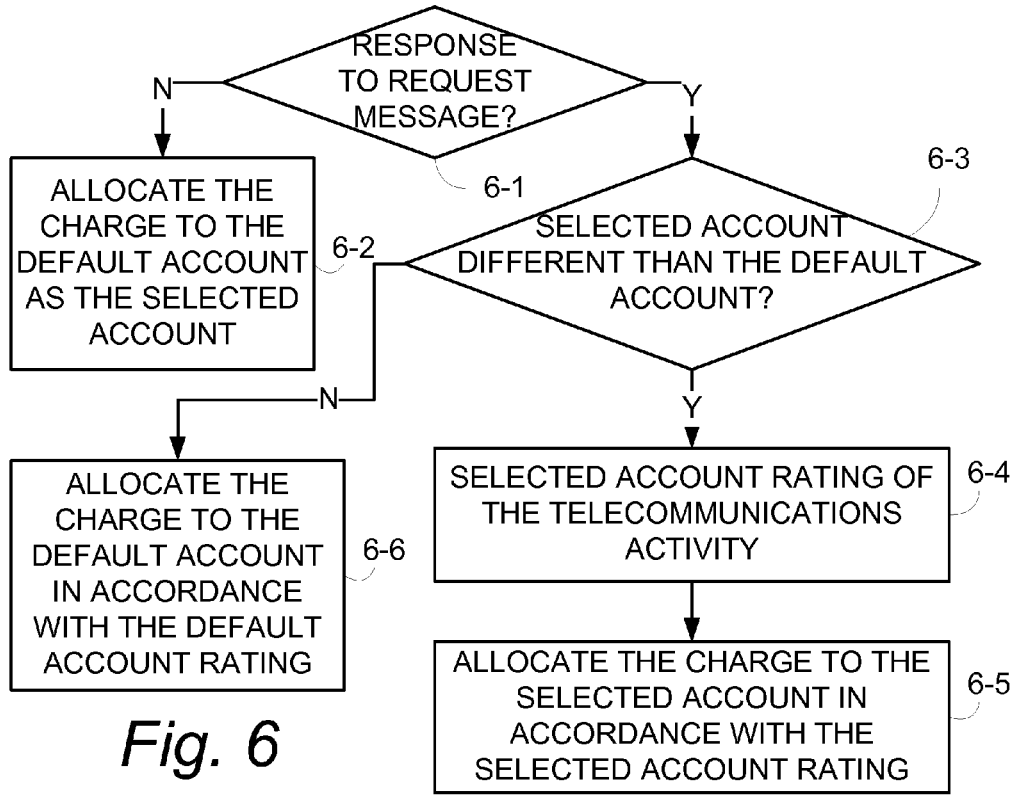
FIG. 6 is a diagrammatic view illustrating various different example scenarios of operation of an example charging system dependent on nature and content of a selection response message.

FIG. 6 illustrates various example response scenarios to the external account selection request message 50. Act 6-1 involves a determination whether a response has been received to the external account selection request message 50 within a defined response acceptance window. If no response is received, as act 6-2 the charging system 22 allocates the charge to the default account as the selected account. If the external account selection response message 51 is received, as act 6-3 a check is made if the externally-controlled account selection (e.g., 51) indicates that the selected account is different than the default account. If the selected account is different than the default account, as act 6-4 the 22 performs a selected account rating of the telecommunications activity, and as act 6-5 allocates the charge to the selected account in accordance with the selected account rating. If it is determined as act 6-3 that the selected account is not different than the default account, e.g., the selected account is the default account; then act 6-6 is performed to allocate the charge to the default account in accordance with the default account rating.

In differing embodiments and modes, the account selection request message sent to the terminal 30 or terminal 31 (e.g., external account selection request message 50), and the account selection response message received therefrom (e.g., the external account selection response message 51), may comprise (1) a voice call to an interactive voice response system; (2) a Short Message Service (SMS) message; (3) an Unstructured Supplementary Services Data (USSD) message; or (4) an Internet message. The technology disclosed herein facilitates account selection request message transit modes corresponding to teach of the foregoing account selection request message embodiments and modes, e.g., (1) a voice account selection message mode; (2) a SMS account selection message mode; (3) a USSD account selection message mode; and (4) an Internet account request message mode.

Figure 7:
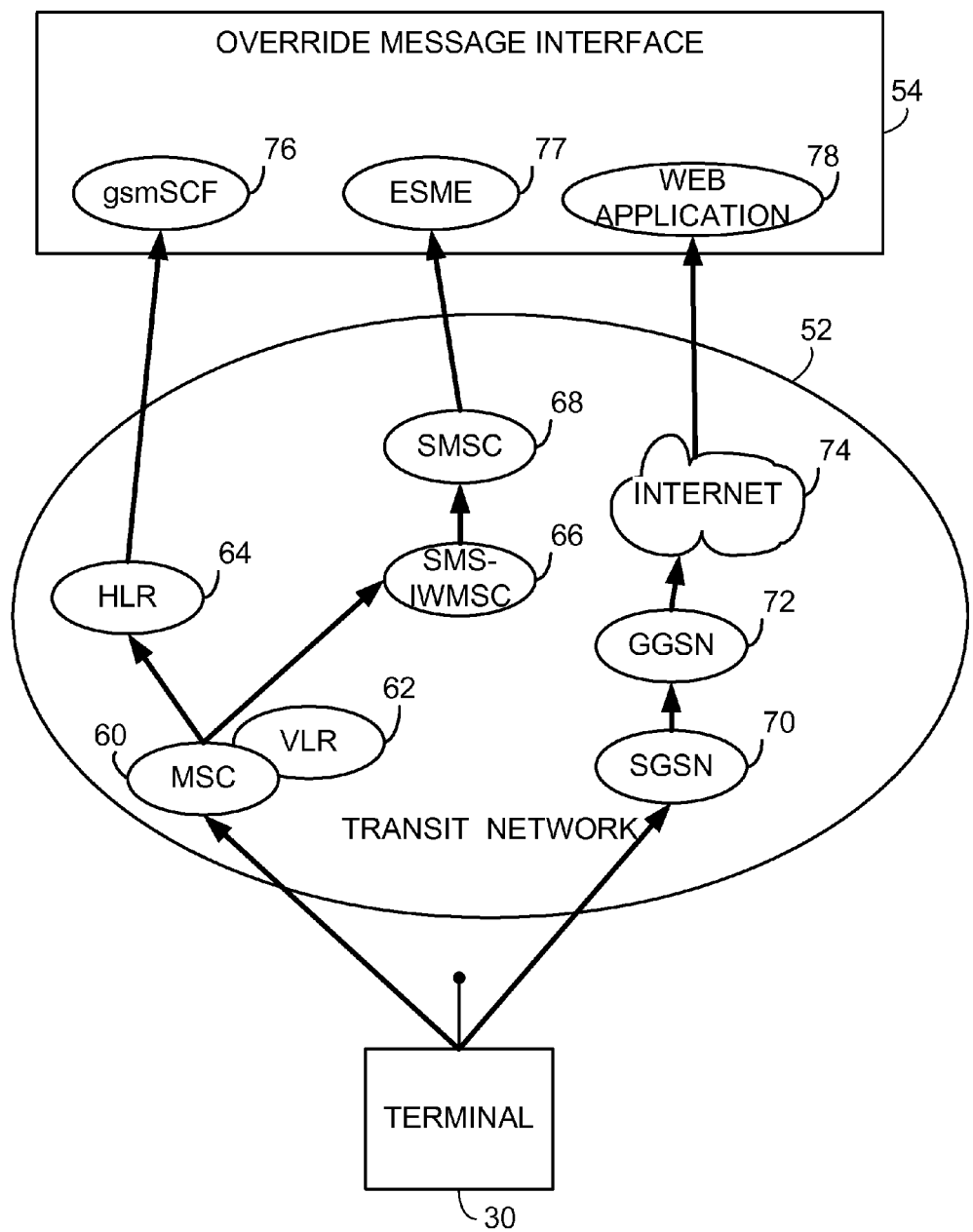
FIG. 7 is a diagrammatic view of portions of a communication system including a transit network and account selection request message interface and illustrating constituent units of the transit network for various message transit modes.

FIG. 7 illustrates various example nodes and/or elements of an example transit network 52, and particularly so when the terminal is a wireless terminal, for example. FIG. 7 shows nodes or servers that may comprise transit network 52 for carrying the account selection request message for each of the account selection request message transit modes described above. For sake of accommodating all account selection request message transmit modes FIG. 7 particularly shows transit network 52 as comprising mobile switching center (MSC) 60; Visitor Location Register (VLR) 62; Home Location Register (HLR) 64; SMS Interworking MSC (SMS-IWMSC) 66; Short Message Service Center (SMSC) 68; Serving GPRS Support Node (SGSN) 70; Gateway GPRS Support Node (GGSN) 72; and Internet 74.

FIG. 7 also shows various units, nodes, or functionalities which comprise external message interface 54 and which participate in or terminate the respective account selection request messages, including GSM Service Control Function (gsmSCF) 76; External Short Messaging Entity (ESME) 77; and Web application 78. GSM Service Control Function (gsmSCF) 76 defines the intelligent network control environment for a mobile network and is enhanced to enable interworking with GSM/GPRS systems, and also stores service logic associated with intelligent network services. The External Short Messaging Entity (ESME) 77 comprises an external application that connects to an SMSC to engage in the sending and/or receiving of SMS messages. A web application is an application that is accessed over a network such as the Internet or an intranet, and may also mean a computer software application that is coded in a browser-supported language (such as JavaScript, combined with a browser-rendered markup language like HTML) and reliant on a common web browser to render the application executable.

Of the entities of transit network 52 shown in FIG. 7, mobile switching center (MSC) 60, Visitor Location Register (VLR) 62, and Home Location Register (HLR) 64 may be involved in handling and/or routing of the account selection request message for both the voice account selection request message mode and the USSD account selection request message mode, which messages are terminated by or at the GSM Service Control Function (gsmSCF) 76 of external message interface 54. The mobile switching center (MSC) 60, Visitor Location Register (VLR) 62, SMS Interworking MSC (SMS-IWMSC) 66, and Short Message Service Center (SMSC) 68 may be involved in handling and/or routing of the account selection request message for the SMS account selection request message mode, which message is terminated by or at External Short Messaging Entity (ESME) 77 of external message interface 54. The Serving GPRS Support Node (SGSN) 70, Gateway GPRS Support Node (GGSN) 72, and Internet 74 may be involved in handling and/or routing of the account selection request message for the Internet account selection request message mode, which message is terminated by or at Web application 78 of external message interface 54.

The external message interface 54 may thus comprise one or more of the interface elements shown in FIG. 7, depending on for how many different modes of account selection request message reception the charging system 22 is configured. For example, in one example embodiment charging system 22 may be configured to receive account selection request messages only according to the SMS account selection request message mode, and accordingly may exclusively or primarily comprise External Short Messaging Entity (ESME) 77. In another example embodiment charging system 22 may be configured to receive account selection request messages only according to the Internet account selection request message mode, and accordingly may exclusively or primarily comprise Web application 78. In yet another example embodiment external message interface 54 may be configured to receive account selection request messages according to plural account selection request message modes (such as, for example, the SMS account selection request message mode and the USSD account selection request message mode), and accordingly may comprise suitable nodes, servers, or devices for terminating or receiving messages according to those messages. Thus, either individual or various combinations of account selection request message modes may be handled by charging system 22, depending on embodiment and configuration.

The charging system 22 may be implemented in various different ways and in different embodiments. For example, charging system 22 may be implemented either in an account-centric embodiment or in a product-centric embodiment. A product-centric embodiment is understood with reference to U.S. patent application Ser. No. 13/464,397 filed May 4, 2012, entitled "PRODUCT-CENTRIC CHARGING SYSTEM AND METHOD", incorporated by reference herein In an example embodiment and as depicted by way of example in FIG. 1, FIG. 2, and FIG. 4, the charging systems may be realized by a machine platform. To this end the figures employ a broken line to represent machine platform P which comprises the charging system. The terminology "machine platform" is a way of describing how the functional units of the charging system may be implemented or realized by machine. The machine platform P can take any of several forms, such as (for example) logic processing circuitry such as, but not limited to, electronic circuitry in the form of a computer implementation platform or hardware circuit platform. In a computer platform implementation, the charging system 22 may be realized by a processor or controller which executes instructions stored on a non-transient computer-readable medium in order to accomplish the functions or realize the above-described units of the charging system 22.

It was mentioned above that the access network 36 can be any suitable type of access network, and that a radio access network is just one example. In a typical cellular radio system, the terminal may be a wireless terminal (also known as mobile station and/or user equipment unit (UE)) which communicate via a radio access network to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The technology described herein that includes features such as prompting a user/subscriber, or other party, at the start of service usage for a decision as to how to allocate the cost of service between plural accounts, such as a private account or a company account, for example. The prompting or request for the externally-controlled account selection may be made in various manners, such as by using USSD or some other text interface, application, portal, or other user communication tools/channel.

As one aspect of certain embodiments of the technology described herein, the network may make all reservations necessary for the telecommunication activity before the actual account selection, but the charging system waits to make a final allocation of the charge with respect to accounts in its database until receipt of a selection in response to its request. As described above, the selection may be either active as when occurs when a response to the request is actually received, or passive in the event that no response is received to the request (and in which case the default account is presumed to be the selected account and the charges allocated to the default account as the selected account). By permitting the temporary allocation of reservations and setup of resources before definitive account selection, the technology described herein saves processing resources (CPU processing resources) and reduces response time when reading-writing to a database.

A default account is used for the temporary allocation for a reservations until the externally-controlled account selection is made. In an example embodiment and mode, which available account and an account database to use as the default account is decided using various input parameters, e.g., such as parameters described in U.S. patent application Ser. No. 12/258,990 of ABRAHAMSSON et al, entitled REAL-TIME FLEXIBLE ACCOUNT SELECTION FOR COMMUNICATIONS, which is incorporated herein by reference in its entirety. When the externally-controlled account selection has been made, a re-rating of the selected account is performed, since such re-rating may impact the cost of the service (the cost of the service may be different using the selected account as compared to the default account). As mentioned above, the default account will be used for the particular service/scenario in the event that a subscriber does not make an active choice.

The technology described herein enables an external decision-maker to easily control and separate private usage from company-related usage. This technology allows account selection based on real information and rationale for using the service, which usually only the subscriber knows and which typically cannot be pre-configured in static rules. By waiting to make a commitment towards an account database with respect to the definitive account to be charged, processing time is saved and response time is reduced.

The technology disclosed herein may be used in conjunction with the technology of U.S. patent application Ser. No. 13/538,000, filed on Jun. 29, 2012, entitled "TERMINAL-INITIATED OVERRIDE OF CHARGING SYSTEM RULES", which is incorporated herein by reference in its entirety.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a charging system for a telecommunications network, the method comprising:
   receiving, by at least one processor, a charging request in conjunction with a telecommunications activity involving a telecommunications terminal;
   determining, by the at least one processor, a default account to which a charge resulting from the charging request may be allocated;
   making, by the at least one processor, a request for an externally-controlled account selection of a selected account, the request made using at least one of a voice call to an interactive voice response system, a Short Message Service (SMS) message, an Unstructured Supplementary Services Data (USSD) message, or an Internet message; and
   allocating, by the at least one processor, the charge to the selected account.

2. The method of claim 1, wherein the externally-controlled account selection is an identification of an alternate account other than the default account.

3. The method of claim 1, wherein the externally-controlled account selection comprises parameters which are externally-input and from which the charging system determines the selected account.

4. The method of claim 1, further comprising, prior to performance of act (3):
  making a temporary allocation for a reservation for the telecommunications activity; and,
  performing a default account rating for the telecommunications activity, the default account rating being performed upon assumption of use of the default account.

5. The method of claim 1, further comprising:
  receiving the externally-controlled account selection, the externally-controlled account selection indicating that the selected account is different than the default account; and then
  performing a selected account rating of the telecommunications activity, the selected account rating being performed upon assumption of use of the selected account;
  finally allocating the charge to the selected account in accordance with the selected account rating.

6. The method of claim 1, further comprising finally allocating the charge to the default account as the selected account in absence of any response to the request.

7. The method of claim 1, further comprising:
  receiving the selection, wherein the selected account is the default account; and then
  finally allocating the charge to the default account in accordance with the default account rating.

8. The method of claim 1, further comprising, prior to performance of act (3), making a determination whether to make the request for the externally-controlled account selection.

9. The method of claim 8, further comprising using the at least one of the following factors for making the determination whether to make the request for the externally-controlled account selection:
  (a) a subscriber account parameter;
  (b) a shared account parameter;
  (c) an input parameter from a external source.

10. The method of claim 1, further comprising requesting a user of the telecommunications terminal to make the externally-controlled account selection of a selected account.

11. The method of claim 1, further comprising using at least one of the following factors for determining the default account:
  (a) a subscriber account parameter;
  (b) a shared account parameter;
  (c) an input parameter from a external source.

12. The method of claim 1, further comprising:
  providing a time window for receiving an indication of the selected account;
  during the time window permitting performance of the telecommunications activity.

13. The method of claim 1, further comprising using electronic circuitry to perform acts (1)-(4).

14. The method of claim 1, further comprising:
  providing a time window for receiving an indication of the selected account;
  during the time window permitting continuation of the reservation.

15. A charging system configured to make an initial determination of a default account to which to allocate a charge resulting from a charging request received in conjunction with a telecommunications activity and thereafter to finally allocate the charge to a selected account in accordance with an externally-controlled account selection, wherein the charging system is further configured to make the request using at least one of (1) a voice call to an interactive voice response system; (2) a Short Message Service (SMS) message; (3) an Unstructured Supplementary Services Data (USSD) message; or (4) an Internet message.

16. The charging system of claim 15, wherein the externally-controlled account selection is an identification of an alternate account other than the default account.

17. The charging system of claim 15, wherein the externally-controlled account selection comprises parameters which are externally-input and from which the charging system determines the selected account.

18. The charging system of claim 15, wherein the charging system is further configured to make a request for the externally-controlled account selection of the selected account.

19. The charging system of claim 18, wherein the charging system is further configured to make the request for the externally-controlled account selection of the selected account after performing a default account rating for the telecommunications activity, the default account rating being performed upon assumption of use of the default account.

20. The charging system of claim 18, wherein the charging system is configured, after receiving an indication that the selected account is different than the default account, to perform a selected account rating of the telecommunications activity upon assumption of use of the selected account before finally allocating the charge to the selected account in accordance with the selected account rating.

21. The charging system of claim 18, wherein the charging system is configured to allocate the charge to the default account as the selected account in absence of any response to the request.

22. The charging system of claim 18, wherein the charging system is configured, upon receiving an indication that the selected account is the default account, to allocate the charge to the default account in accordance with the default account rating.

23. The charging system of claim 18, wherein the charging system is configured to make a determination whether to make the request for the externally-controlled account selection.

24. The charging system of claim 23, wherein the charging system is configured to use at least one of the following factors to make the determination whether to make the request for the externally-controlled account selection:
  (a) a subscriber account parameter;
  (b) a shared account parameter;
  (c) an input parameter from a external source.

25. The charging system of claim 15, wherein the charging system is configured to make the initial determination of the default account using at least one of the following factors:
  (a) a subscriber account parameter;
  (b) a shared account parameter;
  (c) an input parameter from a external source.

26. The charging system of claim 15, wherein the charging system is configured to provide a time window for receiving an indication of the selected account and to permit performance of the telecommunications activity during the time window.

27. The charging system of claim 15, wherein the charging system comprises electronic circuitry.

* * * * *